(12) United States Patent
Halbig et al.

(10) Patent No.: US 12,386,123 B2
(45) Date of Patent: Aug. 12, 2025

(54) CONNECTOR ASSEMBLY FOR CONNECTING SIGNAL CONDUCTORS

(71) Applicant: MD Elektronik GmbH, Waldkraiburg (DE)

(72) Inventors: Thomas Halbig, Dietfurt (DE); Helmut Pritz, Ampfing (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 427 days.

(21) Appl. No.: 18/045,836

(22) Filed: Oct. 12, 2022

(65) Prior Publication Data

US 2023/0123938 A1 Apr. 20, 2023

(30) Foreign Application Priority Data

Oct. 19, 2021 (DE) .......................... 102021127033.2

(51) Int. Cl.
*G02B 6/38* (2006.01)

(52) U.S. Cl.
CPC .................................. *G02B 6/3831* (2013.01)

(58) Field of Classification Search
None
See application file for complete search history.

(56) References Cited

U.S. PATENT DOCUMENTS

| | | |
|---|---|---|
| 5,035,644 A | 7/1991 | Nakazato et al. |
| 5,376,017 A | 12/1994 | Taniuchi et al. |
| 5,782,647 A | 7/1998 | Okura et al. |
| 9,680,256 B1 | 6/2017 | Lane et al. |
| 11,588,274 B2 * | 2/2023 | Kirschner .......... H01R 13/6272 |
| 2011/0104945 A1* | 5/2011 | Gao ....................... H01R 43/00 29/874 |

FOREIGN PATENT DOCUMENTS

| | | | | |
|---|---|---|---|---|
| CN | 103278890 B | * | 4/2016 | ........... G02B 6/3816 |
| CN | 115421255 A | * | 12/2022 | ........... G02B 6/3826 |
| DE | 19502387 A1 | | 8/1995 | |
| DE | 202021103607 U1 | | 7/2021 | |
| EP | 0848456 B1 | | 3/2003 | |
| JP | 63128674 U | | 8/1988 | |

OTHER PUBLICATIONS

European Patent Office, European Search Report in European Patent Application No. 22 18 7140, pp. 1-9, Mar. 15, 2023.

* cited by examiner

*Primary Examiner* — Chris H Chu
(74) *Attorney, Agent, or Firm* — LEYDIG, VOIT & MAYER, LTD.

(57) ABSTRACT

A connector assembly includes a connector, a mating connector and a lever unit mounted on the connector and having a locking element and a securing element. The connector and the mating connector are movable into a connected position in which the connector and the mating connector are conductively interconnected. The connector and the mating connector each have a contact carrier, each having a receiving opening. In the connected position, the lever unit is movable between a locking position and an unlocking position. In the locking position, the locking element is located in the receiving openings of both contact carriers, and in the unlocking position, the locking element is located outside the receiving opening of at least one of the contact carriers. In the connected position, the securing element is movable into a blocking position in which the securing element secures the lever unit in place in the locking position.

10 Claims, 4 Drawing Sheets

CONNECTOR ASSEMBLY FOR CONNECTING SIGNAL CONDUCTORS

CROSS REFERENCE TO RELATED APPLICATION

This application claims benefit to German Patent Application No. DE 10 2021 127 033.2, filed on Oct. 19, 2021, which is hereby incorporated by reference herein.

FIELD

The invention relates to a connector assembly for releasably connecting, in particular electrical and optical, signal conductors.

BACKGROUND

In order to create a releasable connection between optical or electrical conductors, connector systems are typically used today. In this connection, one usually makes use of an operating principle where one mating connector section has a latch hook and one mating connector section has a latch tab. To mechanically connect the two mating connector sections, the latch hook is connected to the latch tab. Both the latch hook and the latch tab are generally disposed on the housings of the mating connector sections. Although the signal conductors are, in fact, also conductively connected to each other during this mating process, the primary and mechanically strong connection is usually made via the housings of the connectors. In this manner, it is possible to produce connector systems which have a low degree of complexity. However, connecting the mating connector sections via the housings has the disadvantage of resulting in additional positional tolerances and component tolerances, which can add up to very large tolerances. Especially when very high signal rates are to be transmitted via the optical or electrical signal conductors, the problem may arise that a sufficiently stable connection of the signal conductors cannot always be ensured due to tolerance variations. It is therefore desirable to keep to a minimum the tolerance chain between the signal conductors to be connected, and to mechanically connect them as directly as possible. However, the disadvantage here is that additional features, such as a position-retaining means intended to prevent unintentional release of the mechanical connection, are difficult to incorporate because of the complex design required for the pluggable connection.

SUMMARY

In an embodiment, the present invention provides a connector assembly including a connector, a mating connector and a lever unit mounted on the connector and having a locking element and a securing element. The connector and the mating connector are movable into a connected position in which the connector and the mating connector are conductively interconnected. The connector and the mating connector each have a contact carrier, each having a receiving opening. In the connected position, the lever unit is movable between a locking position and an unlocking position. In the locking position, the locking element is located in the receiving openings of both of the contact carriers, and in the unlocking position, the locking element is located outside the receiving opening of at least one of the contact carriers. In the connected position, the securing element is movable into a blocking position in which the securing element secures the lever unit in place in the locking position

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
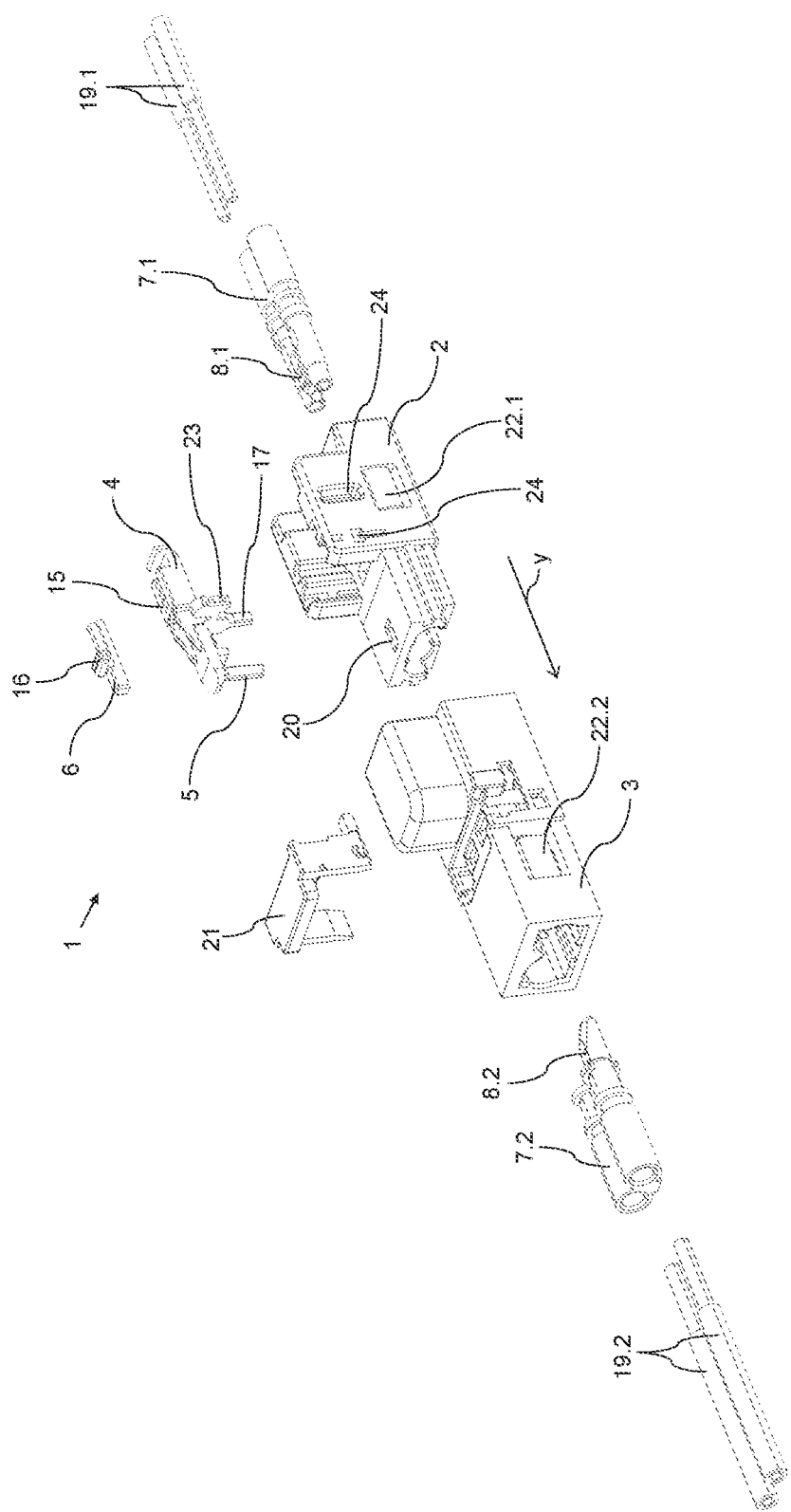
FIG. 1 is a three-dimensional exploded view of a first embodiment of a connector assembly according to the invention.

In an embodiment, the present invention overcomes at least one of the disadvantages of the above-mentioned prior art and provides a connector assembly that has a position-retaining means and allows the signal conductors of two mating connector sections to be interconnected via as small a tolerance chain as possible.

A connector assembly according to an embodiment of the invention includes a connector and a mating connector. A lever unit is mounted on the connector. The lever unit is preferably releasably mounted on the connector. The lever unit may be configured as a second-class lever or as a first-class lever. The lever unit has a locking element and a securing element. The connector and the mating connector are movable into a connected position in which the connector and the mating connector are conductively interconnected. Both the connector and the mating connector may have one or a plurality of signal conductors. In this context, a "conductive connection" can be understood to mean that signals can be transmitted between the signal conductors of the connector and the signal conductors of the mating connector. The connector and the mating connector each have a contact carrier. Both the contact carrier of the connector and the contact carrier of the mating connector have a receiving opening. The contact carriers are essentially used for holding the signal conductors. In the connected position, the lever unit is movable between a locking position and an unlocking position. For this purpose, the lever unit may, for example, be pivotally mounted on the connector. The lever unit may for this purpose have an operating portion to which a force may be applied to move the lever unit between the locking position and the unlocking position. In the locking position, the locking element is located in the receiving openings of both contact carriers. Therefore, it is preferred that, in the connected position, the receiving openings of the two contact carriers be in alignment with each other. In the unlocking position, the locking element is located outside the receiving opening of at least one contact carrier. It is preferred here that, in the unlocking position, the locking element be located outside the receiving opening of the mating connector. The lever unit may have an acting portion in which the locking element is disposed. The acting portion may adjoin the operating portion. In the connected position, the securing element is movable into a blocking position in which the securing element secures the lever unit in place in the locking position. The securing element may be disposed in the operating portion or in the acting portion.

The connector assembly according to the invention makes it possible to achieve a connection between two signal conductors that is particularly reliable and has little susceptibility to disturbance. At the same time, the securing element can ensure that a connection created by the lever unit between the connector and the mating connector cannot be unintentionally released. Since both the locking element and the securing element are formed by the lever unit, it is additionally possible to provide a simple construction for the connector assembly.

The locking element may be disposed on a first side of the lever unit. Preferably, the first side faces the connector. Furthermore, the locking element may extend perpendicularly away from the first side. The securing element may be disposed on a second side of the lever unit opposite the first side. The first and/or the second side may be parallel to a mating axis of the connector assembly. In this context, the mating axis can be understood to be a directional axis along which the connector is moved relative to the mating connector in order to place the connector and the mating connector in the connected position. Preferably, the second side faces away from the connector. Furthermore, the first side may be parallel to the second side.

In the connected position, the connector may be disposed partially within an insertion chamber of the mating connector. In the blocking position, the securing element may bear against a first abutment surface of the insertion chamber. The first abutment surface preferably extends parallel to the mating axis and may form part of the inner wall of the insertion chamber. It is therefore particularly advantageous if, in the connected position, the lever unit is disposed at least partially within the insertion chamber. Furthermore, the securing element may bear against the first abutment surface with a side that faces away from the second side of the lever unit.

The connector or the mating connector may have a second abutment surface adapted to butt against the securing element when, in the connected position, the lever unit is moved from the unlocking position to the locking position, and to move the securing element out of the blocking position. Preferably, the second abutment surface adjoins the first abutment surface. Furthermore, the second abutment surface is preferably parallel to the first abutment surface. Preferably, the abutment surface is configured such that the securing element disengages from the abutment surface before the lever unit reaches the locking position, so that the securing element can be moved into the blocking position as soon as the lever unit is in the locking position. The securing element may be moved out of the blocking position by a resilient deformation, so that the securing element automatically returns to the blocking position when the locking position is reached.

The securing element may be movable between the blocking position and a releasing position. Preferably, at least in the locking position, the securing element is movable parallel to the mating axis between the blocking position and the releasing position. In the releasing position, the securing element is preferably disposed such that the lever unit is movable from the locking position to the unlocking position without being blocked by the securing element. Furthermore, the securing element may have an actuating element by which the securing element can be moved between the blocking position and the releasing position.

The lever unit may have a spring element that biases the securing element in the releasing position toward the blocking position. Preferably, the spring element is relaxed, or does not exert any force on the securing element, when the securing element is in the blocking position. The spring element may be disposed on the second side of the lever unit.

The lever unit may have a guide groove in which the securing element is movably guided. Preferably, the guide groove is disposed on the second side of the lever unit. Furthermore, the guide groove is preferably parallel to the mating axis. Preferably, the guide groove is open at a side facing away from the second side. The guide groove is preferably disposed both in the acting portion and in the operating portion.

The securing element may have at least one latching element which retains the securing element at least in the blocking position. The lever unit preferably has a complementary latching element which is connectable to the latching element. Even more preferably, the lever unit has two complementary latching elements which are connectable to the latching element, the latching element being connectable to the first complementary latching element when the securing element is in the blocking position, and the latching element being connectable to the second complementary latching element when the securing element is in the releasing position.

The lever unit may be mounted on the connector in such a manner that it is movable between a pre-latched position and a final latched position. Furthermore, the lever unit may have a secondary locking element which, in the final latched position, secures the contact carrier of the connector in place within the connector. It is preferred that the secondary locking element release the contact carriers so that the contact carriers can be removed from the connector, provided the contact carriers are not secured in place in the connector by another fastening means. The lever unit preferably has latching noses which are connectable to first and second latch receptacles on the connector. Preferably, the latching noses are connected to the first latch receptacles in the pre-latched position and to the second latch receptacles in the final latched position. Preferably, the latching noses and the secondary locking element are disposed in a common plane which is in particular perpendicular to the mating axis. The secondary locking element may be disposed on the first side of the lever unit and may extend substantially perpendicularly away from the first side. Furthermore, the secondary locking element may be disposed parallel to the locking element. The secondary locking element may be formed in one piece with the locking element. Preferably, in the final latched position, the lever unit is movable between the locking position and the unlocking position.

The lever unit may be configured as a first-class lever, an axis of rotation of the first-class lever being disposed in the secondary locking element or in a plane that is perpendicular to the mating axis and parallel to a longest side of the secondary locking element. The lever unit may be divided by the secondary locking element into the operating portion and the acting portion.

FIG. 1 shows a three-dimensional exploded view of a first embodiment of the connector assembly 1 according to the invention. Connector assembly 1 has a connector 2 and a mating connector 3. Connector 2 and mating connector 3 each have a contact carrier 7.1; 7.2. Contact carrier 7.1 of connector 2 and contact carrier 7.2 of mating connector 3 each have two signal conductors 19.1; 19.2. In the present embodiment, signal conductors 19.1; 19.2 are optical waveguides for transmitting light signals. Contact carrier 7.1 of connector 2 is releasably secured to connector 2 by means of primary locking means 22.1. Likewise, contact carrier 7.2 of mating connector 3 is secured to mating connector 3 by means of primary locking means 22.2. Contact carrier 7.2 of mating connector 3 is additionally secured to mating connector 3 by means of a secondary retention means 21. Connector 2 and mating connector 3 may be releasably interconnected in a connected position by means of a lever unit 4. In the present embodiment, lever unit 4 is configured as a first-class lever. In the present embodiment, lever unit 4 is releasably mounted on connector 2. Lever unit 4 has latching noses 23 which are connectable to latch receptacles 24 on connector 2. Lever unit 4 has a locking element 5 by which the contact carriers 7.1; 7.2 of connector 2 and mating connector 3 can be interlockingly connected. Furthermore, lever unit 4 has a securing element 6 which is disposed on lever unit 4 in such a manner that it is movable parallel to a mating axis y between a blocking position and a releasing position. For this purpose, securing element 6 is guided in a guide groove 15. Furthermore, securing element 6 has an actuating element 16 by which securing element 6 can be moved between the blocking position and the releasing position.

Figure 2:
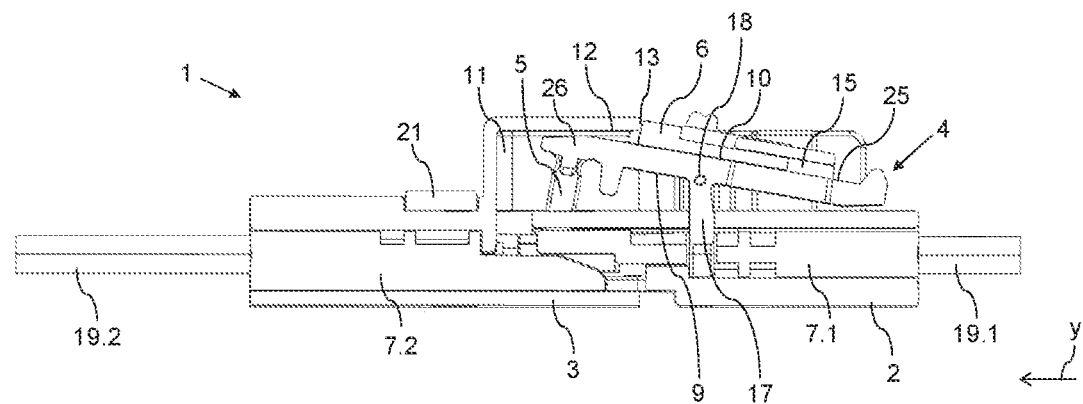
FIG. 2 is a sectional view of the inventive connector assembly according to the first embodiment, shown during a mating process.

FIG. 2 shows, in sectional view, the first embodiment of the inventive connector assembly 1 during a process of mating connector 2 with mating connector 3. The sectional plane of the sectional view extends parallel to mating axis y. During the mating process, connector 2 and mating connector 3 are moved toward each other along the mating axis. Mating connector 3 has an insertion chamber 11 into which connector 2 and lever unit 4 are partially inserted. Locking element 5 is disposed on a first side 9 of lever unit 4. Securing element 6 is disposed on a second side 10 of lever unit 4. Furthermore, a secondary locking element 17 is disposed on first side 9. Guide groove 15, secondary locking element 17, and locking element 5 are formed integrally with and of the same material as lever unit 4. The mating process results in lever unit 4 being displaced about an axis of rotation 18 into an unlocking position. Axis of rotation 18 is formed within secondary locking element 17. Secondary locking element 17 divides lever unit 4 into an operating portion 25 and an acting portion 26. Acting portion 26 can be displaced by pressing on operating portion 25. Locking element 5 is disposed in acting portion 26. Guide groove 15 extends across both operating portion 25 and acting portion 26, so that securing element 6 is also movable across both operating portion 25 and acting portion 26. The displacement of lever unit 4 during the mating process causes securing element 6 to butt against a second abutment surface 13 on mating connector 3. If connector 2 is moved further into insertion chamber 11, securing element 6 is thus moved from the blocking position to the releasing position. This ensures that the mating process will not be hindered by securing element 6.

Figure 3:
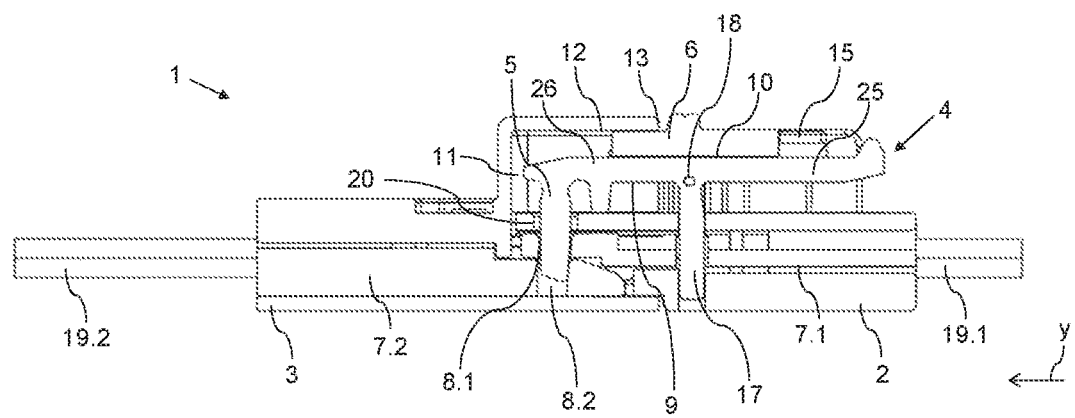
FIG. 3 is a sectional view of the inventive connector assembly according to the first embodiment, with a securing element in a blocking position.

FIG. 3 shows another sectional view of the first embodiment of the connector assembly 1 according to the invention, the sectional plane extending parallel to the mating axis. Connector 2 and mating connector 3 are in a connected position. In the connected position, signal conductors 19.1 of connector 2 are conductively connected to signal conductors 19.2 of mating connector 3, so that signals can be transmitted between signal conductors 19.1; 19.2. Contact carriers 7.1; 7.2 each have a receiving opening 8.1; 8.2. Lever unit 4 is in a locking position. Locking element 5 is disposed within a through-opening 20 as well as in both receiving openings 8.1; 8.2. Thus, connector 2 is interlockingly but releasably connected to mating connector 3. Securing element 6 is located in the blocking position. In the present embodiment, in the blocking position, securing element 6 bears against a first abutment surface 12 within insertion chamber 11. First abutment surface 12 partially forms an inner wall of insertion chamber 11. By securing element 6 being located in the blocking position, lever unit 4 is blocked in the locking position. Securing element 6 is connected to guide groove 15 via a latching element, so that securing element 6 cannot move by itself out of the blocking position.

Figure 4:
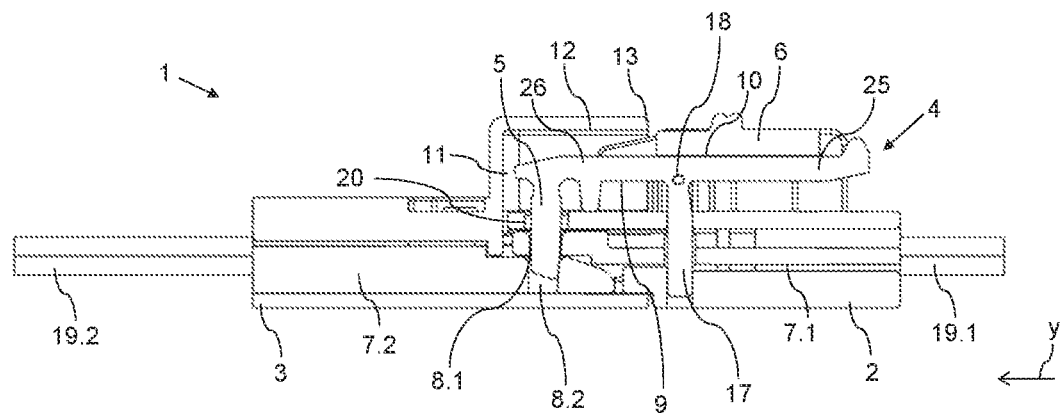
FIG. 4 is a sectional view of the inventive connector assembly according to the first embodiment, with the securing element in a releasing position.

FIG. 4 shows another sectional view of the first embodiment of the connector assembly according to the invention, with a sectional plane parallel to mating axis y. Connector 2 and mating connector 3 are in the connected position. Lever unit 4 is located in the locking position, with securing element 6 being in the releasing position. Therefore, the interlocking connection between connector 2 and mating connector 3 can be released, for example, by pushing operating portion 25 of lever unit 4 toward connector 2, thereby moving lever unit 4 to the unlocking position, in which locking element 5 is located within receiving opening 8.1 of connector 2 and within through-opening 20.

Figure 5:
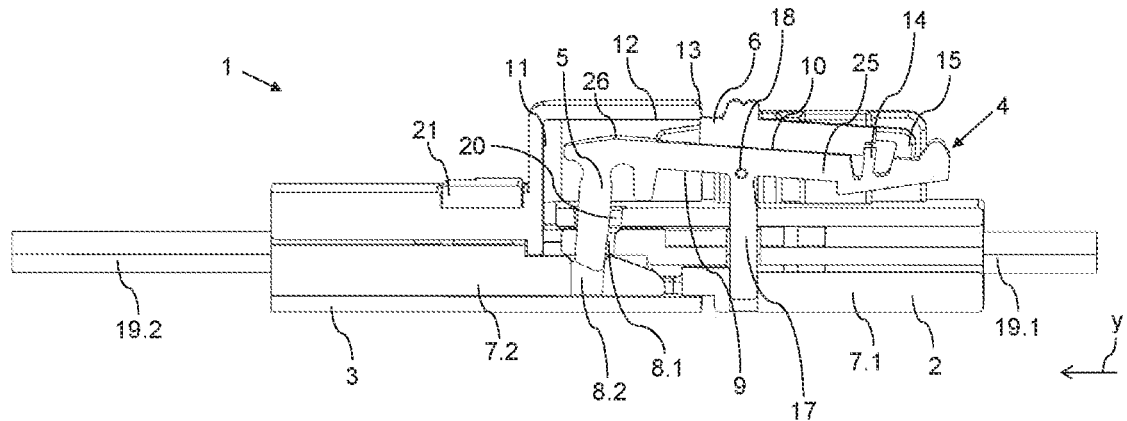
FIG. 5 is a sectional view of the inventive connector assembly according to a second embodiment, shown during a mating process.

FIG. 5 shows, in sectional view, a second embodiment of the inventive connector assembly 1 during a process of mating connector 2 with mating connector 3. The sectional plane extends parallel to mating axis y. In the view shown, lever unit 4 is located in a moving position between the locking position and the unlocking position. Lever unit 4 has a spring element 14. The mating process causes securing element 6 to butt against second abutment surface 13 of mating connector 3 and to be moved to the releasing position. Since spring element 14 bears against securing element 6, spring element 14 is resiliently deflected. As a result of the deflection, spring element 14 biases securing element 6 toward the blocking position.

Figure 6:
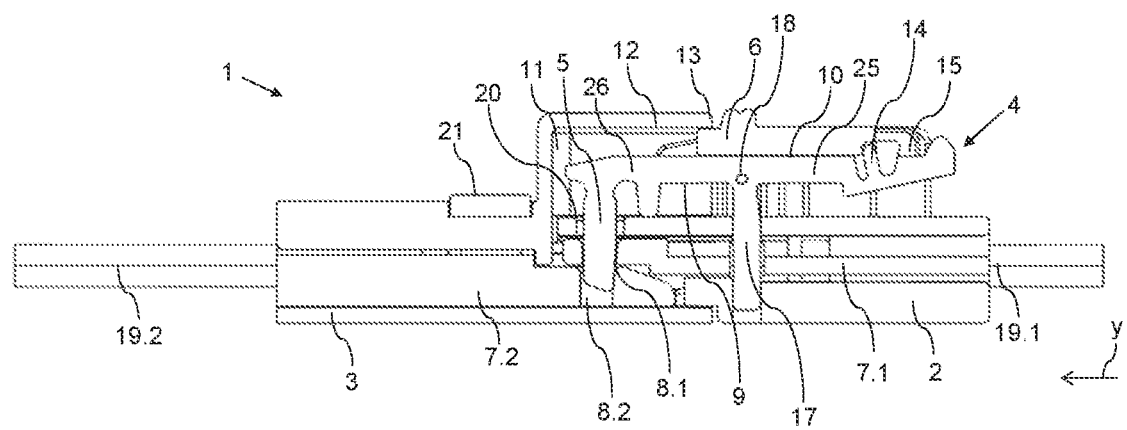
FIG. 6 is a sectional view of the inventive connector assembly according to the second embodiment, with the securing element in the blocking position.

FIG. 6 shows a sectional view of the second embodiment of the inventive connector assembly 1 in the connected position, the sectional plane extending parallel to mating axis y. Lever unit 4 is located in the locking position. Securing element 6 is located in the blocking position and bears against second abutment surface 13. Because of spring element 14, which biases securing element 6 into the blocking position, securing element 6 can move by itself to the blocking position as soon as lever unit 4 moves to the locking position and securing element 6 disengages from second abutment surface 13.

Figure 7:
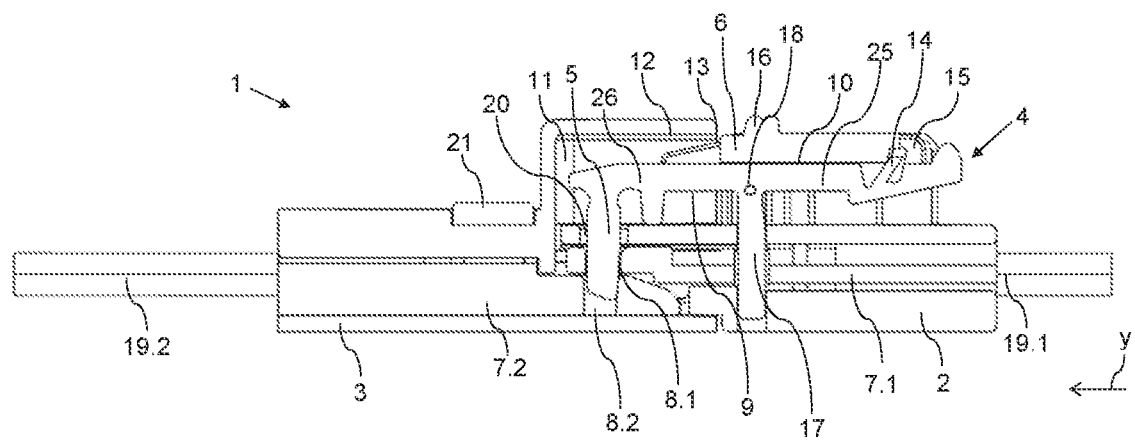
FIG. 7 is a sectional view of the inventive connector assembly according to the second embodiment, with the securing element in the releasing position.

FIG. 7 shows another sectional view of the second embodiment of the inventive connector assembly 1 in the connected position, the sectional plane extending parallel to mating axis y. Securing element 6 is located in the releasing position. The movement of securing element 6 to the releasing position causes spring element 14 to be biased against securing element 6 again, so that securing element 6 can be moved to the releasing position only by an externally applied force. This can be done, for example, by a fitter moving securing element 6 to the releasing position using actuating element 16.

Figure 8:
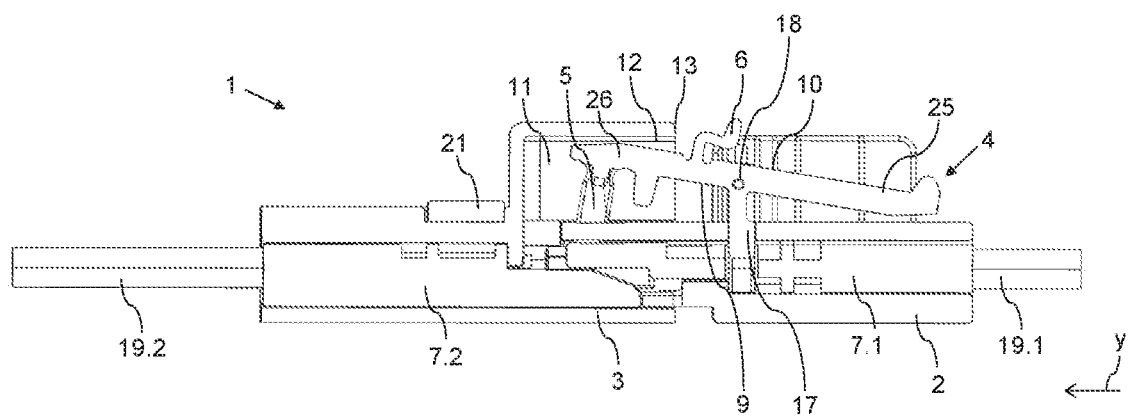
FIG. 8 is a sectional view of the inventive connector assembly according to a third embodiment, shown during a mating process.

FIG. 8 shows, in sectional view, a third embodiment of the inventive connector assembly 1 during a process of mating connector 2 with mating connector 3. The sectional plane extends parallel to mating axis y. Lever unit 4 is located in the unlocking position. Securing element 6 is formed in one piece with lever unit 4 and has an angled shape. Once connector 2 and mating connector 3 are located in the connected position and lever unit 4 is located in the locking position, securing element 6 bears against first abutment surface 12, thus blocking lever unit 4 in the locking position. Securing element 6 can be moved out of the blocking position by resilient deflection.

Figure 9:
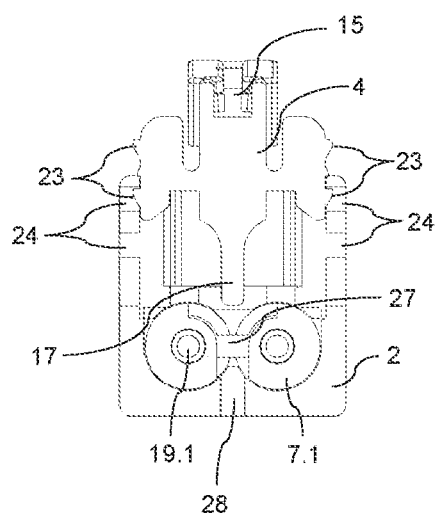
FIG. 9 is a sectional view of the inventive connector assembly according to the first embodiment, with a lever unit in a pre-latched position.

FIG. 9 shows a sectional view of the first embodiment of the connector assembly 1 according to the invention. The sectional plane extends perpendicular to mating axis y and through secondary locking element 17. Lever unit 4 is secured to connector 2 in a pre-latched position. To this end, lever unit 4 is connected by latching noses 23 to latch receptacles 24 of connector 2. Secondary locking element 17 is located outside an insertion channel 27 of contact carrier 7.1, so that contact carrier 7.1 can be easily removed from connector 2 as soon as the primary locking means is released from contact carrier 7.1.

Figure 10:
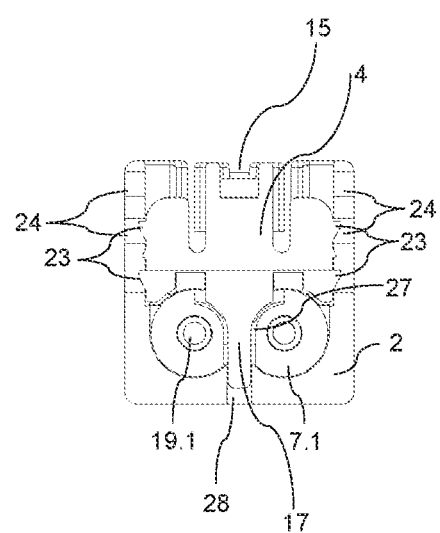
FIG. 10 is a sectional view of the inventive connector assembly according to the first embodiment, with the lever unit in a final latched position.

FIG. 10 shows a sectional view of the first embodiment of the connector assembly 1 according to the invention. The sectional plane extends perpendicular to mating axis y and through secondary locking element 17. Lever unit 4 is in a final latched position. To this end, lever unit 4 is connected to latching noses 23 via additional latch receptacles 24 in connector 2. Secondary locking element 17 is disposed within insertion channel 27 of contact carrier 7.1 and within a locating opening 28 in connector 2, so that contact carrier 7.1 is additionally secured by the lever unit 4 located in the final latched position.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 connector assembly
2 connector
3 mating connector
4 lever unit
5 locking element
6 securing element
7 contact carrier
8 receiving opening
9 first side
10 second side
11 insertion chamber
12 first abutment surface
13 second abutment surface
14 spring element
15 guide groove
16 actuating element
17 secondary locking element
18 axis of rotation
19 signal conductor
20 through-opening
21 secondary retention means
22 primary locking means
23 latching nose
24 latch receptacle
25 operating portion
26 acting portion
27 insertion channel
28 locating opening

The invention claimed is:

1. A connector assembly, comprising:
a connector;
a mating connector; and
a lever unit mounted on the connector and having a locking element and a securing element,
wherein:
the connector and the mating connector are movable into a connected position in which the connector and the mating connector are conductively interconnected,
the connector and the mating connector each have a contact carrier, each having a receiving opening,
in the connected position, the lever unit is movable between a locking position and an unlocking position,
in the locking position, the locking element is located in the receiving openings of both of the contact carriers, and in the unlocking position, the locking element is located outside the receiving opening of at least one of the contact carriers,
in the connected position, the securing element is movable into a blocking position in which the securing element secures the lever unit in place in the locking position, and
the lever unit is mounted on the connector in such a manner that the lever unit is movable between a pre-latched position and a final latched position and has a secondary locking element which, in the final latched position, secures the contact carrier of the connector in place within the connector.

2. The connector assembly as recited in claim 1, wherein the locking element is disposed on a first side of the lever unit, and the securing element is disposed on a second side of the lever unit opposite the first side.

3. The connector assembly as recited in claim 1, wherein, in the connected position, the connector is disposed partially within an insertion chamber of the mating connector, and, in the blocking position, the securing element bears against a first abutment surface of the insertion chamber.

4. The connector assembly as recited in claim 1, wherein the connector or the mating connector has a second abutment surface configured to butt against the securing element when, in the connected position, the lever unit is moved from the unlocking position to the locking position, and to move the securing element out of the blocking position.

5. The connector assembly as recited in claim 1, wherein the securing element is movable between the blocking position and a releasing position parallel to a mating axis.

6. The connector assembly as recited in claim 5, wherein the lever unit has a spring element that biases the securing element in the releasing position toward the blocking position.

7. The connector assembly as recited in claim 5, wherein the lever unit has a guide groove in which the securing element is movably guided.

8. The connector assembly as recited in claim 5, wherein the securing element has at least one latching element which retains the securing element at least in the blocking position.

9. The connector assembly as recited in claim 1, wherein, in the final latched position, the lever unit is movable between the locking position and the unlocking position.

10. The connector assembly as recited in claim 1, wherein the lever unit is configured as a first-class lever, and an axis of rotation of the first-class lever is disposed in the secondary locking element.

* * * * *